J. G. RAHNER.
Combined Knife and Match Safe.

No. 209,359.  Patented Oct. 29, 1878.

Witnesses  
Frank A. Brooks  
Chas. G. Yale.

Inventor  
John G. Rahner  
By Dewey & Co  
attys

UNITED STATES PATENT OFFICE.

JOHN G. RAHNER, OF PORTLAND, OREGON.

IMPROVEMENT IN COMBINED KNIFE AND MATCH-SAFE.

Specification forming part of Letters Patent No. 209,359, dated October 29, 1878; application filed August 30, 1878.

*To all whom it may concern:*

Be it known that I, JOHN GEORGE RAHNER, of Portland, county of Multnomah and State of Oregon, have invented an Improved Pocket-Knife; and I do hereby declare the following to be a full, clear, and exact description thereof, reference being had to the accompanying drawings.

My invention relates to pocket-knives; and it consists in making a knife with a handle provided with a side receptacle to contain matches, pins, tooth-picks, and similar small articles.

Figure 1:
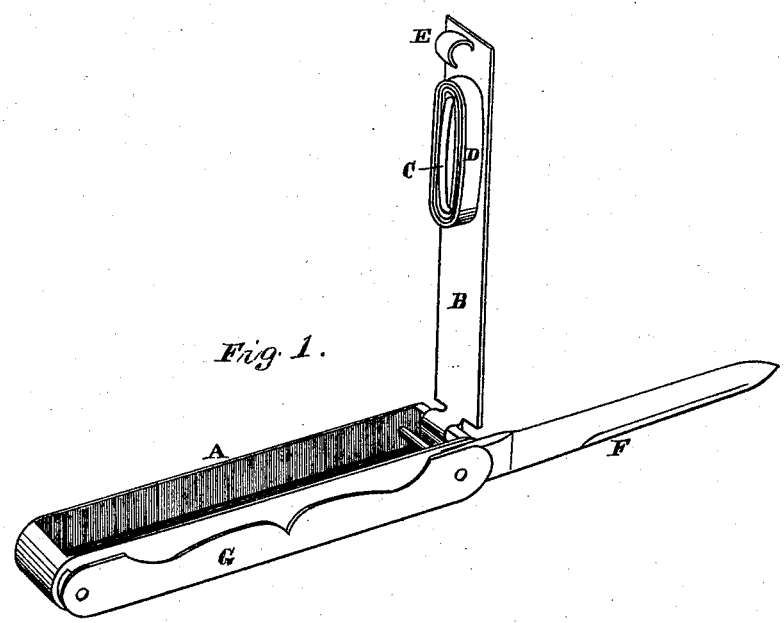
Figure 2:
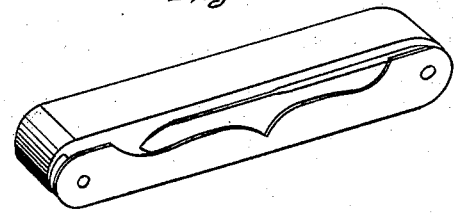

Referring to the accompanying drawings, Figures 1 and 2 are views of my invention.

Let A represent a case or receptacle having a hinged cover, B, which opens lengthwise of the case or safe, the hinge being formed at one end, as shown. A snap or hasp, E, is also formed on the inner end of the cover, which, by its spring, holds the cover in position when closed. On one side of the case or safe is hinged a knife-blade, F, such as is used for pocket-knives, and a guard, G, is formed outside of it, so as to make a case for the blade.

This device may be made compact and light, so that it will be no more bulky than an ordinary pocket-knife. The case may be used as a match-safe, or for pins, needles, tooth-picks, tobacco, or snuff, or for containing paper currency.

The device is made of suitable shape, so that the knife may be used without disturbing the contents of the safe portion. By this means I provide a useful device in which is combined a receptacle for small pocket articles and a pocket-knife.

Having thus described my invention, what I claim as new, and desire to secure by Letters Patent, is—

A pocket-knife provided with a side receptacle, A, for containing small articles, as described.

In witness whereof I hereunto set my hand and seal.

JOHN GEORGE RAHNER. [L. S.]

Witnesses:
H. J. McCORMICK,
HANLEY H. HOLMES.